(12) United States Patent
Parfondry et al.

(10) Patent No.: US 6,590,008 B1
(45) Date of Patent: *Jul. 8, 2003

(54) PROCESS FOR MAKING LOW DENSITY FOAMS, POLYOL COMPOSITION AND REACTION SYSTEM USEFUL THEREFOR

(75) Inventors: Alain Parfondry, Brussels (FR); Jianming Yu, Brussels (FR)

(73) Assignee: Huntsman International LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/979,849
(22) PCT Filed: May 5, 2000
(86) PCT No.: PCT/EP00/04038
§ 371 (c)(1), (2), (4) Date: Mar. 1, 2000
(87) PCT Pub. No.: WO00/73362
PCT Pub. Date: Dec. 7, 2000

(30) Foreign Application Priority Data

May 31, 1999 (EP) .............................................. 99110480

(51) Int. Cl.$^7$ ............................................... C08G 18/10
(52) U.S. Cl. ............. 521/174; 252/182.25; 252/182.27; 521/130
(58) Field of Search ................................. 521/130, 174; 252/182.25, 182.27

(56) References Cited

U.S. PATENT DOCUMENTS

| | | | | |
|---|---|---|---|---|
| 5,063,253 A | * | 11/1991 | Gansen et al. ............... | 521/159 |
| 5,369,138 A | * | 11/1994 | Gansen ....................... | 521/159 |
| 5,420,170 A | * | 5/1995 | Lutter et al. ............ | 252/182.24 |
| 6,034,197 A | * | 3/2000 | Mahon et al. .......... | 252/182.25 |
| 6,284,812 B1 | * | 9/2001 | Rotermund et al. ........ | 521/131 |

FOREIGN PATENT DOCUMENTS

| | | |
|---|---|---|
| DE | 4318120 | 12/1994 |
| EP | 331941 | 9/1989 |
| EP | 433878 | 6/1991 |
| EP | 555721 | 8/1993 |

* cited by examiner

Primary Examiner—John M. Cooney, Jr.
(74) Attorney, Agent, or Firm—Pillsbury Winthrop LLP

(57) ABSTRACT

The invention relates to a polyol composition comprising by weight 60–97% of b1) a polyoxyethylene-polyoxypropylene polyol, having a functionality of 2–6, with 10–25% tipped EO, 3–40% of b2) a polyoxyethylene-polyoxypropylene polyol, having a functionality of 2–6, with 20–50% total EO and 10–20% tipped EO; and 0–25% of b3) a polyol, having a functionality of 2–6, with at least 50% random EO. The invention also relates to a process for preparing a flexible polyurethane foam by reacting a) a polyisocyanate composition; b) a polyol composition of the invention; c) water; and d) additives and auxiliaries known per se. The invention finally relates to a reaction system comprising A) a polyisocyanate and B) an isocyanate-reactive component comprising the polyol of the invention.

19 Claims, No Drawings

PROCESS FOR MAKING LOW DENSITY FOAMS, POLYOL COMPOSITION AND REACTION SYSTEM USEFUL THEREFOR

This application is the National Phase of International Application PCT/EP00/04038 filed May 5, 2000, which designated the U.S. and that International Application was published under PCT Article 21(2) in English. The PCT application is hereby incorporated in its entirety by reference.

The instant invention relates to a process for making low density foams. It also relates to a specific polyol composition and to a reaction system that are useful in the said process.

For flexible polyurethane foams, low density means cost effectiveness. Thus, low density is a target, that should however not be obtained with detrimental effects on the foam properties. Physical blowing, using carbon dioxide for example, is known to reduce foam density, but is associated with processing difficulties as well as the need for additional equipment.

U.S. Pat. No. 5,686,502 discloses foams obtained through a one-shot process, where the polyol comprises a first polyol which is a poly(oxyalkylene)triol which is chain terminated with oxypropylene (PO) and a second polyol which is either (i) a poly(oxyalkylene)diol terminated with EO, or (ii) a polyfunctional polyol terminated with PO. The thus obtained foams are hydrophylic. The densities obtained in the examples vary between 13 and 20 kg/m$^3$. There is no mention of the resilience.

U.S. Pat. No. 5,420,170 discloses foams that are visco-elastic which are prepared by reacting a specific polyol composition. The polyol composition comprises a block PO/EO polyol having an OH value of 14 to 65, 2 to 9% of tipped EO and a functionality of 2.3 to 2.8 and a di-or tri-functional PO/EO polyol having an OH value of 20 to 80 and 60 to 85% of EO (preferably up to 20% as tipped EO). The resulting foams are visco-elastic and do not exhibit any ball rebound (for densities obtained in the examples of about 70–77 kg/m$^3$).

U.S. Pat. No. 4,833,176 discloses a process comprising reacting a polyisocyanate with a polyol at a NCO index below 70. The polyol may vary; examples comprise mixtures of a low EO-content polyol and high EO content polyol.

EP-A-0 845 485 discloses a process for preparing flexible foams comprising reacting a polyisocyanate with a polyol, where the polyol is a specific polyol composition. Said polyol composition comprises: (i) a polyetherpolyol having a functionality of 2.5–6.0, which is a PO/EO polyol with 15% or less of EO; (ii) a polyetherpolyol having a functionality of 1.8–2.5, which is an all-PO polyol; (iii) a polyetherpolyol having a functionality of 1.8–6.0 and having an EO content of at least 50 wt %. The respective amounts of components (i), (ii) and (iii) are as follows: (i) 15–70%, (ii) 30–80%, and (iii) 3–15%, based on the combined weights of the polyols.

U.S. Pat. No. 5,594,097 discloses a polyol comprising PO and EO, having an OH value of 16–45, a primary hydroxyl content of at least 50%, an EO content of 21–49%, and having a structure of the type PO-(PO/EO)-EO, where the tipped EO content is 10–20%. This specific polyol is said to be usable in combination with other polyols. All examples, however, relate to polyol compositions comprised solely of this specific polyol. Also, while a relatively low density is obtained, (i) there is no disclosure of the resilience values and (ii) there are processing difficulties and bad compression set when the EO-enriched polyol is used as the main polyol.

None of the above documents teaches or suggests the instant invention.

The following way of describing polyols is used in the present application: A PO-EO polyol is a polyol having first a PO block attached to the initiator followed by an EO block. A PO-PO/EO polyol is a polyol having first a PO block and then a block of randomly distributed PO and EO. A PO-PO/EO-EO polyol is a polyol having first a PO block then a block of randomly distributed PO and EO and then a block of EO. A PO-EO polyol is a polyol having first a PO block and then an EO block. In the above descriptions only one tail of a polyol is described (seen from the initiator); the nominal hydroxy functionality will determine how many of such tails will be present.

The present invention provides a process that surprisingly affords a resilient flexible polyurethane foam having a good stability (low recession) and the advantages of EO enriched polyol as the main polyol (i.e. density reduction) without having the drawbacks (i.e. negative impact on mechanical properties, like tensile strength, elongation and tear strength).

The invention thus provides a polyol composition comprising:

b1) a polyoxyethylene-polyoxypropylene polyol, having an average nominal hydroxyl functionality of 2–6 where the EO is present as tipped EO, the EO content being between 10–25% by weight based on the weight of the polyol b2) a polyoxyethylene-polyoxypropylene polyol, having an average nominal hydroxy functionality of 2–6, where the EO is present as tipped EO and random EO, the total EO content being between 20–50% and the tipped EO content being between 10–20%, both by weight based on the weight of the polyol b3) a polyol, having an average nominal hydroxy functionality of 2–6, and comprising EO and optionally PO where the EO is present as random EO, the EO content being at least 50% by weight based on the weight of the polyol these polyols b1, b2 and b3 being present according to the following proportions, based on the combined weights of b1, b2 and b3, b1: 60–97 wt %, b2: 3–40 wt %, b3: 0–25 wt %.

Unless otherwise stated amounts of EO and PO in a polyol are indicated hereinafter as % by weight based on the weight of the polyol.

The invention thus provides a process for preparing a flexible polyurethane foam at an NCO index of 70–120 and preferably of 70–105 by reacting a) a polyisocyanate;

b1) a polyoxyethylene-polyoxypropylene polyol, having an average nominal hydroxyl functionality of 2–6 where the EO is present as tipped EO, the EO content being between 10–25%;

b2) a polyoxyethylene-polyoxypropylene polyol, having an average nominal hydroxy functionality of 2–6, where the EO is present as tipped EO and random EO, the total EO content being between 20–50%, the tipped EO content being between 10–20%, b3) a polyol, having an average nominal hydroxy functionality of 2–6, and comprising EO and optionally PO where the EO is present as random EO, the EO content being at least 50%, these polyols b1, b2 and b3 being present according to the following proportions, based on the combined weights of b1, b2 and b3, b1: 60–97 wt %, b2: 3–40 wt %, b3: 0–25 wt %;

c) water; and d) additives and auxiliaries known per se.

The invention finally relates to a reaction system comprising A) a polyisocyanate and B) an isocyanate-reactive component comprising the polyol of the invention and water, as well as to a reaction system comprising A) a polyisocyanate prepolymer obtained by reacting the polyisocyanate with part of the polyol composition of the invention, and B) an isocyanate-reactive component comprising the remainder of the polyol composition of the invention and water.

In the context of the present invention the following terms, if and whenever they are used, have the following meaning:

1) isocyanate index or NCO index:

the ratio of NCO-groups over isocyanate-reactive hydrogen atoms present in a formulation, given as a percentage $$\frac{[NCO] \times 100}{[active\ hydrogen]}(\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water, if used) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen, one primary or secondary amine group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "average nominal hydroxyl functionality" is used herein to indicate the average functionality (number of hydroxyl groups per molecule) of the polyol composition on the assumption that this is the average functionality (number of active hydrogen atoms per molecule) of the initiator(s) used in their preparation although in practice it will often be somewhat less because of some terminal unsaturation.

6) The term "average" is used to indicate an average by number. The polyisocyanates may be selected from aliphatic, cycloaliphatic and aralphatic polyisocyanates, especially diisocyanates, like hexamethylene diisocyanate, isophorone diisocyanate, cyclohexane-1, 4-diisocyanate, 4,4'-dicyclohexylmethane diisocyanate and m-and p-tetramethylxylylene diisocyanate, and in particular aromatic polyisocyanates like tolylene diisocyanates (TDI), phenylene diisocyanates and most preferably diphenylmethane diisocyanate optionally comprising homologues thereof having an isocyanate functionality of 3 or more (such diisocyanates comprising such homologues are known as crude MDI or polymeric MDI or mixtures of such crude or polymeric MDI with MDI) and modified variants thereof.

The diphenylmethane diisocyanate (MDI) used may be selected from 4,4'-MDI, 2,4'-MDI, isomeric mixtures of 4,4'-MDI and 2,4'-MDI and less than 10% by weight of 2,2'-MDI, and modified variants thereof containing carbodiimide, uretonimine, isocyanurate, urethane, allophanate, urea and/or biuret groups. Preferred are 4,4'-MDI, isomeric mixtures of 4,4'-MDI and 2,4'-MDI and less than 10% by weight of 2,2' MDI and uretonimine and/or carbodiimide modified MDI having an NCO content of at least 20% by weight and preferably at least 25% by weight and urethane modified MDI obtained by reacting excess MDI and polyol having a molecular weight of at most 1000 and having an NCO content of at least 20% by weight and preferably at least 25% by weight.

Diphenylmethane diisocyanate comprising homologues having an isoycanate functionality of 3 or more are so-called polymeric or crude MDI.

Polymeric or crude MDI are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisoycanates in such crude or polymeric MDI compositions determine the average functionality of the compositions, that is the average number of isocyanate groups per molecule. By varying the proportions of starting materials, the averace functionality of the polysiocyanate compositions can be varied from little more than 2 to 3 or even higher. In practice, however, the average isocyanate functionality preferably ranges from 2.3–2.8. The NCO value of such polymeric or crude MDI is at least 30% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation of polyamines. Further modified variants of such crude or polymeric MDI may be used as well comprising carbodiimide, uretonimine, isocyanurate, urethane, allophanate, urea and/or biuret groups; especially the aforementioned uretonimine and/or carbodiimide modified ones and the urethane modified ones are preferred. Mixtures of polyisocyanates may be used as well.

The invention also relates to a polyol composition, comprised of polyols b1, b2 and b3.

Polyol b1 can be prepared by known methods. It has a structure of the type PO-EO, where EO is present as tipped EO. The EO content is from 10 to 25% by weight.

Polyol b2 can also be prepared by known methods. It can have a structure of the type PO-PO/EO-EO or of the type PO/EO-EO. EO is present as tipped and random. The total EO content is from 20 to 50% by weight, preferably from 21 to 49%, the tipped EO content is from 10–20% by weight. In the PO-PO/EO-EO type polyol, the first PO block comprises preferably from 20 to 75% by weight of the PO units. Preferably the weight ratio tipped EO/random EO is from 1:3 to 3:1. The polyol having a structure of the type PO-PO/EO-EO can notably be produced according to the teaching of U.S. Pat. No. 5594097. The polyol having a structure of the type -PO/EO-EO can notably be produced according to the teaching of U.S. Pat. No. 4559366.

Polyol b3 is the optional polyol. It can also be prepared by known methods. It can have a structure of type PO/EO or of the type -EO (PEG). EO is present as random EO (if and when PO is present). The EQ content is more than 50% by weight. Preferably it is a polyoxyethylene polyol. The functionality of these polyols is comprised between 2 and 6, preferably between 2 and 4.

For b1 and b2, the equivalent weight is generally comprised between 1000 and 4000, preferably 1500 and 3500; while for b3, the equivalent weight is generally comprised between 200 and 3000, preferably 300 and 2000.

The polyol composition comprises the various polyols according to the following proportions, expressed on the basis of the combined weights of the polyols:

b1: 60–97%, preferably 65–90% b2: 3–40%, preferably 10–30% b3: 0–25%, preferably 0–10% (more preferably 3–10%); all percentages being % by weight.

Each component b1, b2 and b3 may be comprised of mixtures.

Dispersed material can also be present. This is known as polymer-modified polyol, and comprise e.g. SAN or PIPA (Poly Isocyanate Poly Addition).

The polymer-modified polyols which are particularly interesting in accordance with the invention are products obtained by in situ polymerisation of styrene and/or acrylonitrile in poly(oxyethylene/oxypropylene)polyols and products obtained by in situ reaction between a polyisocyanate and an amino-or hydroxy-functional compound (such as triethanolamine) in a poly(oxyethylene/oxypropylene) polyol. The solids content (based on the total polyol weight b1+b2+b3) can vary within broad limits, e.g. from 5 to 50% by weight. Particle sizes of the dispersed polymer of less than 50 microns are preferred. Mixtures can be used as well.

Water is used as the blowing agent. Carbon dioxide may be added if needed. In the case of highly resilient water blown flexible foams, it is appropriate to use from 1.0 to 15 and preferably from 2 to 10% by weight of water based on the weight of the total polyol component where the water can optionally be used in conjunction with carbon dioxide.

Other conventional ingredients (additives and/or auxiliaries) may be used in making the polyurethanes. These include catalysts, for example, tertiary amines and organic tin compounds, surfactants, cross linking or chain extending agents, for example, low molecular weight compounds such as diols, triols (having a molecular weight below the one of b3) and diamines, flame proofing agents, for example halogenated alkyl phosphates, fillers and pigments. Foam stabilizers, for example polysiloxane-polyalkylene oxide block copolymers, may be used to stabilize or regulate the cells of the foam.

The amount of these minor ingredients used will depend on the nature of the product required and may be varied within limits well known to a polyurethane foam technologist.

The present invention also relates to a process for preparing a flexible polyurethane foam at an NCO index of 70–120 by reacting a polyisocyanate a); a polyoxyethylene-polyoxypropylene polyol b1); a polyoxyethylene-polyoxypropylene polyol b2); a polyol b3); according to ratios specified above; water c); and additives and auxiliaries known per se d).

These components, notably the polyols b1, b2 and b3 can be added in any order. Notably, the polyols can be added according to the following non-limiting possibilities:

Part of b1+b2+b3, then the remainder of b1+b2+b3;

Part of b1+b2 but no b3, then the remainder of b1+b2 and all b3;

Part of b1+b3 but no b2, then the remainder of b1+b3 and all b2;

all of b1, then the all of b2+b3; all of b2, then the all of b1+b3;

Part of b1, then the remainder of b1 together with the all of b2+b3;

Part of b2, then the remainder of b2 together with the all of b1+b3;

And any other possibility.

In the process of the invention, it is to be noted that one shot, prepolymer or quasi-prepolymer methods may thus be employed as may be appropriate for the particular type of polyurethane being made. The components of the polyurethane forming reaction mixture may be mixed together in any convenient manner, for example the individual components may be pre-blended so as to reduce the number of component streams to be brought together in the final mixing step. It is often convenient to have a two-stream system whereby one stream comprises a polyisocyanate or isocyanate-terminated prepolymer and the second stream comprises all the other components of the reaction mixture.

The flexible foams may be made according to techniques known in the art like the moulding or the slabstock technique. The foams may be used in the furniture and automotive industries in seating, cushioning and mattresses.

The flexible foams thus obtained have a free rise density comprised between 18 and 60 kg/m$^3$. These foams show a resilience higher than 45%.

The following examples illustrate the invention without limiting same.

Unless otherwise indicated, all parts are given by weight.

Glossary (All Functionalities are Nominal Functionalities, equivalent weichts are nominal equivalent weights, all % are % by weight and OH values are in mg KOH/g)

Polyol A PO-EO, with EO as tipped. EO content is 15%. Equivalent weight is 2004. Functionality is 3, OH value is 28.

Polyol B PO-PO/EO-EO, total EO content is 21%. Tip EO content is 15%. Equivalent weight is 2004. Functionality is 3, OH value is 28.

Polyol C PO-PO/EO-EO, total EO content is 28,6%. Tip EO content is 15%. Equivalent weight is 2004. Functionality is 3, OH value is 28.

Polyol D PO/EO-EO, total EO content is 26%. Tip EO content is 15. Equivalent weight is 2158. Functionality is 3, OH value is 26.

Polyol E PO/EO-EO, total EO content is 21%. Tip EO content is 15%. Equivalent weight is 1934. Functionality is 3, OH value is 29.

Polyol F polyoxyethylene polyol having an equivalent weight of 450, an OH value of 123 and a functionality of 3.

Polyol G Polymer polyol, comprising 25% of dispersed particulate SAN material in high molecular weight polyol, similar to polyol A, but with an equivalent weight of 1600 and an OH value of 35.

Polyol H PO/EO-EO, total EO content is 28%. Tip EO content is 15%. Equivalent weight is 2004. Functionality is 3, OH value is 28. Primary hydroxyl content is 85.2

Polyol I PO-PO/EO-EO, total EO content is 28%. First PO block contains 55% PO over total PO and EO. Tip EO content is 15%. Equivalent weight is 2004. Functionality is 3, OH value is 29. Primary hydroxyl content is 86.7

Isocyanate A MDI comprising 93.8% diisocyanate 48.2% of which is 2,4'-MDI and 6.2% is oligomer species of higher functionality. Functionality is 2.05.

Isocvanate B MDI comprising 87.5% diisocyanate 46.0% of which is 2,4'-MDI and 12.5% is oligomer species of higher functionality. Functionality is 2.10.

Isocyanate C Quasi-prepolymer based on MDI (81.3% diisocyanate 30% of which is 2,4'-MDI and 18.7% is oligomer species of higher functionality, Functionality is 2.16.) and polyol A. NCO value is 29.7.

Isocyanate D MDI comprising 78.2% diisocyanate 26.0% of which is 2,4'-MDI and 21.8% is oligomer species of higher functionality. Functionality is 2.19.

D8154 Amine catalyst from Air Products

Niax A1 Catalyst from Union Carbide

D33LV Catalyst from Air Products

DMEA Dimethylethanolamine

DETDA diethyl toluenediamine

Foams are produced according to the following scheme. Polyols, catalysts, surfactants, water are mixed prior to the addition of isocyanates. Polyol blends and isoyanates are mixed at 20° C. during 8 seconds before foaming. Free-rise foams are made in plastic buckets of 2.5 1 to 10 1. Moulded foams are made with a square mould of 9.11 preheated to 45° C.

The properties of the foam are determined according to the following methods and standards FRD (Free Rise Density);

OAD (OverAll Density) (kg/cm$^3$), and CD (Core Density) (kg/cm$^3$): ISO 845 Compression hardness; CLD 40% (kPa) and Hysteresis Loss (%): ISO 3386–1 Compression set (thickness): Dry 75% (%) and Humid 75% (%): ISO 1856 Indentation Hardness: ILD 40% (N) and Hysteresis Loss (%): ISO 2439 Resilience (%) Toyota Tear strength, max (N/rn): ISO 8067 Tensile strength (kpa) and Elongation (%): ISO 1798

The results are summarized in the following tables. From the last table, one will note that the specific polyols of the type PO/EO-EO are even better than those of the type PO-PO/EO-EO, since they provide higher foam stability (lower recession %) and lower free rise density, and are thus particularly designed for making lower density foams.

| | Examples | | | | | | | | | | | |
|---|---|---|---|---|---|---|---|---|---|---|---|---|
| Component | 1 | 2 | 3 | 4 | 5 | 6 | 7 | 8 | 9 | 10 | 11 | 12 |
| Polyol A | 75 | 65 | 65 | 75 | 85 | 85 | 65 | 60 | 85 | 75 | 75 | 65 |
| Polyol B | 20 | 30 | 30 | 20 | | | | | | | | |
| Polyol C | | | | | 10 | 10 | 30 | 35 | 10 | 20 | 20 | 30 |
| Polyol D | | | | | | | | | | | | |
| Polyol E | | | | | | | | | | | | |
| Polyol F | 5 | 5 | 5 | 5 | 5 | 5 | 5 | 5 | 5 | 5 | 5 | 5 |
| Polyol G | | | | | | | | | | | | |
| Water | 6.5 | 6.5 | 6 | 6 | 5 | 5 | 6 | 6 | 5 | 6 | 7 | 8 |
| B 4113 | 0.8 | 0.8 | 1.2 | 1.2 | 0.5 | 1.0 | 1.0 | 1.0 | 1.0 | 1.0 | 1.0 | 1.0 |
| D 8154 | 0.7 | 0.7 | 0.6 | 0.6 | 0.7 | 0.5 | 0.5 | 0.5 | 0.5 | 0.5 | 0.5 | 0.5 |
| Niax A1 | 0.1 | 0.1 | 0.1 | 0.1 | | 0.1 | 0.1 | 0.1 | 0.1 | 0.1 | 0.1 | 0.1 |
| D 33 LV | 0.3 | 0.3 | 0.3 | 0.3 | | 0.3 | 0.3 | 0.3 | 0.3 | 0.3 | 0.3 | 0.3 |
| DMEA | | | | | 0.5 | | | | | | | |
| DETDA | | | | | 0.3 | | | | | | | |
| Isocyanate A | 80 | 80 | | | | 75 | 85 | 85 | | | | |
| Isocyanate B | | | 80 | 80 | | | | | 75 | 85 | 85 | 100 |
| Isocyanate C | | | | | 76 | | | | | | | |
| NCO index | 80 | 80 | 86 | 86 | 85 | 89 | 85.6 | 85.6 | 96 | 86.4 | 80 | 82.2 |

| | Examples | | | | | | | | | | | |
|---|---|---|---|---|---|---|---|---|---|---|---|---|
| Component | 13 | 14 | 15 | 16 | 17 | 18 | 19 | 20 | 21 | 22 | 23 | 24 |
| Polyol A | 65 | 65 | 65 | 65 | 85 | 85 | 67 | 67 | 55 | 65 | 55 | 55 |
| Polyol B | 30 | 30 | 30 | 30 | | | | | | 30 | | |
| Polyol C | | | | | 10 | 10 | 8 | 8 | | | | |
| Polyol D | | | | | | | | | | 10 | 20 | |
| Polyol E | | | | | | | | | | | | 20 |
| Polyol F | 5 | 5 | 5 | 5 | 5 | 5 | 5 | 5 | 5 | 5 | 5 | 5 |
| Polyol G | | | | | | | 20 | 20 | 15 | 20 | 20 | 20 |
| Water | 6 | 6 | 7 | 7 | 5 | 5 | 4 | 5 | 6.6 | 4 | 4 | 4 |
| B 4113 | 1.2 | 1.2 | 1.2 | 1.2 | 1.2 | 1.2 | 0.5 | 0.5 | 1.2 | 0.5 | 0.5 | 0.5 |

-continued

| | | | | | | | | | | | | |
|---|---|---|---|---|---|---|---|---|---|---|---|---|
| D 8154 | 0.6 | 0.6 | 0.6 | 0.6 | 0.6 | 0.6 | 0.7 | 0.7 | 0.6 | 0.7 | 0.7 | 0.7 |
| Niax A1 | 0.1 | 0.1 | 0.1 | 0.1 | 0.1 | 0.1 | | | 0.1 | | | |
| D 33 LV | 0.3 | 0.3 | 0.3 | 0.3 | 0.3 | 0.3 | | | 0.3 | | | |
| DMEA | | | | | | | 0.5 | 0.5 | | 0.5 | 0.5 | 0.5 |
| DETDA | | | | | | | 0.3 | 0.3 | | 0.3 | 0.3 | 0.3 |
| Isocyanate A | | | | | | | | | | | | |
| Isocyanate B | 75 | 80 | 80 | 85 | 75 | 80 | | | 85 | | | |
| Isocyanate C | | | | | | | 63 | 76 | | 63 | 63 | 63 |
| NCO index | 80 | 86 | 74 | 79 | 96 | 101 | 86 | 86 | 83.5 | 86 | 86 | 86 |

| | Examples | | | | | | | | | | | |
|---|---|---|---|---|---|---|---|---|---|---|---|---|
| Properties | 1 | 2 | 3 | 4 | 5 | 6 | 7 | 8 | 9 | 10 | 11 | 12 |
| Cells | open | open | open* | Open* | open | open | open | open | open* | open* | open | open |
| Recession % | 8 | 4 | 0 | 0 | 2 | 5 | 5 | 2 | 0 | 0 | 0 | 2 |
| FRD (kg/cm³) | 26.7 | 23.3 | 22 | 22.8 | 33.5 | 27.7 | 24.6 | 23.5 | 25.5 | 19.6 | 21.2 | 19.6 |
| Moulding overall density kg/m³ | | | | | | | | | | | | |
| Core density (kg/m³) | | | | | | | | | | | | |
| Compression hardness | | | | | | | | | | | | |
| CLD 40% (kPa) | | | 1.7 | | 3.25 | 2.8 | 2.8 | 2.7 | 1.7 | 2.3 | 2.2 | 3.2 |
| Hysteresis (%) | | | 34.3 | | 35.05 | 34 | 39.3 | 42.7 | 31.35 | 39.5 | 42.4 | 46.5 |
| Compression set (thick) | | | | | | | | | | | | |
| Dry 75% (%) | | | | | | | | | | | | |
| Humid 75% (%) | | | | | | | | | | | | |
| Indentation hardness | | | | | | | | | | | | |
| ILD 40% (N) | | | | | | | | | | | | |
| Hysteresis (%) | | | | | | | | | | | | |
| Resilience (%) | | | | | | | | | 55.4 | | 48.2 | |
| Tear strength | | | | | | | | | | | | |
| Max (N/m) | | | | | | | | | | | | |
| Tensile strength (kPa) | | | | | | | | | | | | |
| Elongation (%) | | | | | | | | | | | | |

| | Examples | | | | | | | | | | | |
|---|---|---|---|---|---|---|---|---|---|---|---|---|
| Properties | 13 | 14 | 15 | 16 | 17 | 18 | 19 | 20 | 21 | 22 | 23 | 24 |
| Cells | open* | open* | open* | open* | open* | open* | Open | Open | | | | |
| Recession % | 0 | 0 | 0 | 0 | 0 | 0 | 0 | 0 | | | | |
| FRD (kg/cm³) | | | | | | | 39 | 34.5 | 22.8 | | | |
| Moulding overall density (kg/m³) | | | | | | | 42.9 | | | 44.2 | 43.9 | 44.8 |
| Core density (kg/m³) | 21.1 | 20.2 | 20.2 | 19.1 | 22.3 | 22.3 | 41 | | | 42.4 | 41.1 | 41.7 |
| Compression hardness | | | | | | | | | | | | |
| CLD 40% (kPa) | 1.4 | 1.6 | 1.5 | 1.6 | 1.5 | 1.9 | 3.7 | 4.6 | 2.7 | 4.6 | 5.0 | 4.6 |
| Hysteresis (%) | 3.0 | 31.9 | 32.4 | 34.5 | 26.1 | 30.4 | 26.9 | 40.6 | 42.9 | 28.7 | 28.4 | 28.4 |
| Compression set (thick) | | | | | | | | | | | | |
| Dry 75% (%) | 12.4 | 11.6 | 18.9 | 25.6 | 7 | 7.5 | 10.1 | | | 8.7 | 9.1 | 8.5 |
| Humid 75% (%) | 25.6 | 36.5 | 49.9 | 53 | 13.3 | 12.5 | 12.8 | | | 10.6 | 9.4 | 9.4 |
| Indentation hardness | | | | | | | | | | | | |
| ILD 40% (N) | | | | | | | 211.8 | | | 255 | 264 | 267 |
| Hysteresis (%) | | | | | | | 28.2 | | | 30.9 | 31.7 | 30.7 |
| Resilience (%) | 51.5 | 51 | 50 | 50 | 56 | 53.5 | 55.4 | | | 54.6 | 54.9 | 54.2 |
| Tear strength | | | | | | | | | | | | |
| Max (N/m) | 205 | 219 | 225 | 248 | 175 | 169 | 190 | | | 246 | 249 | 246 |
| Tensile strength (kPa) | 70 | 81 | 80 | 84 | 78 | 83 | 87.2 | | | 85 | 79 | 84 |
| Elongation (%) | 135 | 117 | 123 | 115 | 108 | 105 | 90 | | | 97 | 97 | 95 |

| | Example | | | | | |
|---|---|---|---|---|---|---|
| Component | 25 | 26 | 27 | 28 | 29 | 30 |
| Polyol A | 90 | 85 | 80 | 90 | 85 | 80 |
| Polyol H | 10 | 15 | 20 | | | |
| Polyol I | | | | 10 | 15 | 20 |
| Water | 4.2 | 4.2 | 4.2 | 4.2 | 4.2 | 4.2 |
| B 4113 | 0.8 | 0.8 | 0.8 | 0.8 | 0.8 | 0.8 |
| Niax A1 | 0.1 | 0.1 | 0.1 | 0.1 | 0.1 | 0.1 |
| D 33 LV | 0.8 | 0.8 | 0.8 | 0.8 | 0.8 | 0.8 |
| Isocyanate D | 60 | 60 | 60 | 60 | 60 | 60 |
| NCO index | 89 | 89 | 89 | 89 | 89 | 89 |
| Cells | open | open | open | open | open | open |
| Recession % | 22 | 16 | 5 | 27 | 20 | 10 |
| FRD (kg/cm³) | 50.5 | 43.8 | 36.3 | 55.9 | 47.9 | 37.8 |
| Compression hardness | | | | | | |

| -continued | | | | | | |
|---|---|---|---|---|---|---|
| CLD 40% (kPa) | 7.0 | 6.0 | 5.1 | 7.3 | 6.4 | 5.1 |
| Hysteresis (%) | 33.9 | 35.7 | 39.6 | 34.1 | 35.0 | 37.7 |

*borderline

What is claimed is:

1. A polyol composition comprising:
   b1) a polyoxyethylene-polyoxypropylene polyol, having an average nominal hydroxyl functionality of 2–6 where the EO is present as tipped EO, the EO content being between 10–25%;
   b2) a polyoxyethylene-polyoxypropylene polyol, having an average nominal hydroxy functionality of 2–6, where the EO is present as tipped EO and random EO, the total EO content being between 20–50%, the tipped EO content being between 10–20%,
   b3) a polyol, having an average nominal hydroxy functionality of 2–6, and comprising EO and optionally PO where the EO is present as random EO, the EO content being at least 50%,
   these polyols b1, b2 and b3 being present according to the following proportions, based on the combined weights of b1, b2 and b3, b1: 60–97 wt %, b2: 3–40 wt %, b3: 0–25 wt %.

2. The polyol composition according to claim 1, which comprises the polyols b1, b2 and b3 according to the following proportions: b1: 65–90 wt %, b2: 10–30 wt %, b3: 0–10 wt %.

3. The polyol composition according to claim 1, in which the polyoxyethylene-polyoxypropylene polyol b2), the weight ratio tipped EO/random EO is between 1:3–3:1.

4. The polyol composition according to claim 1, wherein the polyol b2) is of the -PO-PO/EO-EO type.

5. The polyol composition of claim 1, wherein the polyol b2) is of the-PO/EO-EO type.

6. The polyol composition of claim 1, wherein the functionality if the polyol b1, b2 and b3 is 2–4.

7. The polyol composition of claim 1, wherein the polyol b3) is a polyoxyethylene polyol.

8. The polyol composition of claim 1, which comprises dispersed particles.

9. The polyol composition of claim 1, wherein the equivalent weight of polyols b1) and b2) is 1000–4000 and of polyol b3) is 200–3000.

10. Process for preparing a flexible polyurethane foam at an NCO index of 70–120 by reacting
    a) a polyisocyanate composition;
    b1) a polyoxyethylene-polyoxypropylene polyol, having an average nominal hydroxyl functionality of 2–6 where the EO is present as tipped EO, the EO content being between 10–25%;
    b2) a polyoxyethylene-polyoxypropylene polyol, having an average nominal hydroxy functionality of 2–6, where the EO is present as tipped EO and random EO, the total EO content being between 20–50%, the tipped EO content being between 10–20%,
    b3) a polyol, having an average nominal hydroxy functionality of 2–6, and comprising EO and optionally PO where the EO is present as random EO, the EO content being at least 50%,
    these polyols b1, b2 and b3 being present according to the following proportions, based on the combined weights of b1, b2 and b3, b1: 60–97 wt %, b2: 3–40 wt %, b3: 0–25 wt %;
    c) water; and
    d) additives and auxiliaries known per se.

11. The process according to claim 10, in which the polyols b1, b2 and b3 are used according to the following proportions: b1: 65–90 wt %, b2: 10–30 wt %, b3: 0–10 wt %.

12. The process according to claim 10, in which the polyoxyethylene-polyoxypropylene polyol b2), the weight ratio tipped EO/random EO is between 1:3–3:1.

13. The process of claim 10, wherein the polyol b2) is of the -PO-PO/EO-EO type.

14. The process composition of claim 10, wherein the polyol b2) is of the-PO/EO-EO type.

15. The process of claim 10, wherein the functionality of the polyols b1, b2 and b3 is 2–4.

16. The process of claim 10, wherein the polyol b3) is a polyoxyethylene polyol.

17. The process of claim 10, in which the polyol comprises dispersed particles.

18. The process of claim 10 wherein polyols b1) and b2) have an equivalent weight of 1000–4000 and polyol b3) of 200–3000 and polyisocyanate is diphenylmethane diisocyanate optionally comprising homologues thereof having an isocyanante functionality of 3 or more modified variants thereof.

19. A reaction system comprising A) a polyisocyanate and B) an isocyanate-reactive component comprising the polyol composition of claim 1 and water.

* * * * *

UNITED STATES PATENT AND TRADEMARK OFFICE
CERTIFICATE OF CORRECTION

PATENT NO. : 6,590,008 B1
DATED : July 8, 2003
INVENTOR(S) : Parfondy et al.

It is certified that error appears in the above-identified patent and that said Letters Patent is hereby corrected as shown below:

<u>Title page,</u>
Item [75], Inventors, should read -- Alain Parfondry, Bruxelles (BE)
                                           Jianming Yu, Bruxelles (BE) --

Signed and Sealed this

Twenty-third Day of December, 2003

JAMES E. ROGAN
*Director of the United States Patent and Trademark Office*